UNITED STATES PATENT OFFICE.

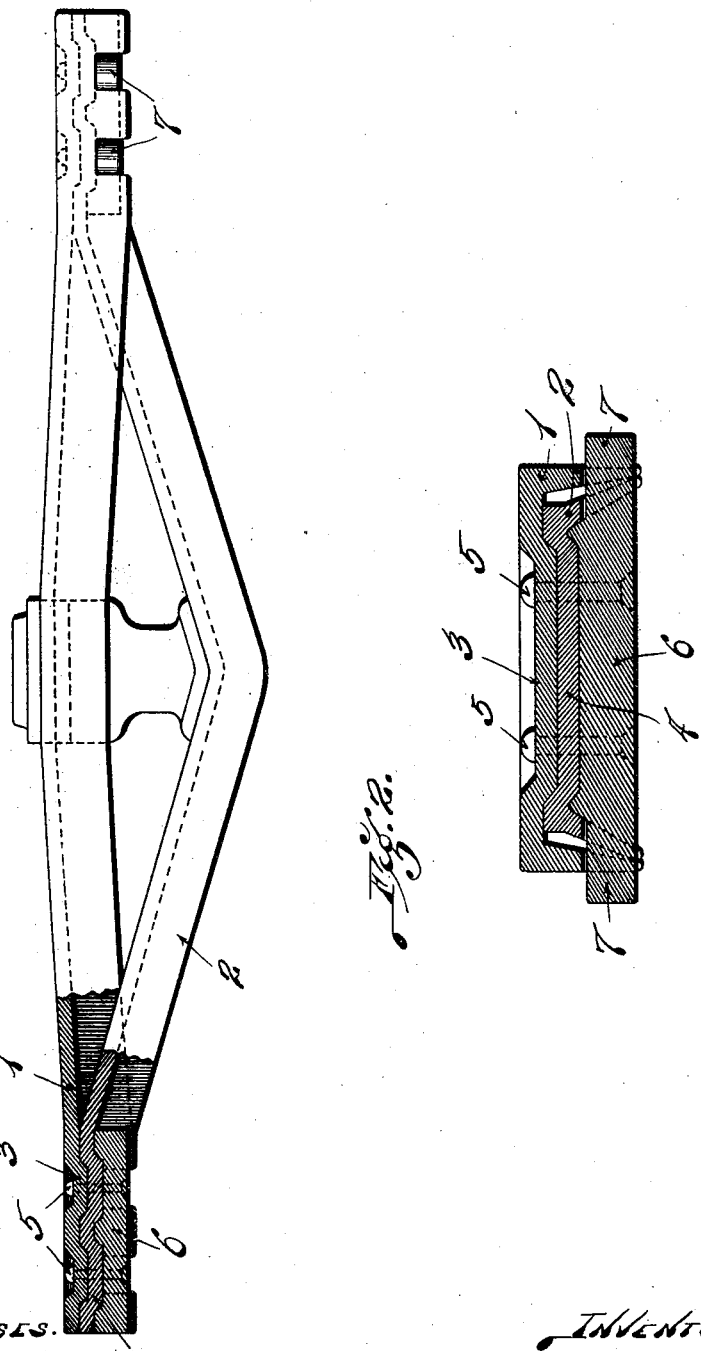

PHILIP B. HARRISON, OF CHICAGO, ILLINOIS, ASSIGNOR TO CHICAGO RAILWAY EQUIPMENT COMPANY, OF CHICAGO, ILLINOIS, A CORPORATION OF ILLINOIS.

TRUSSED STRUCTURE.

980,099.      Specification of Letters Patent.      Patented Dec. 27, 1910.

Original application filed July 12, 1909, Serial No. 507,180. Divided and this application filed April 30, 1910. Serial No. 558,646.

*To all whom it may concern:*

Be it known that I, PHILIP B. HARRISON, a citizen of the United States, residing at Chicago, Illinois, have invented a certain new and useful Improvement in Trussed Structures, of which the following is a full, clear, and exact description, such as will enable others skilled in the art to which it appertains to make and use the same, reference being had to the accompanying drawings, forming a part of this specification, in which—

Figure 1 is a side elevational view, partly in section, of my improved trussed structure; and Fig. 2 is a cross-sectional view through the end thereof.

This invention relates to a new and useful improvement in a trussed structure designed for use as a truck bolster, though, with slight modifications, it may be employed as a body bolster, brake beam, etc., the object being to utilize flanged compression and tension members whose ends are nested and interlocked so as to be firmly secured together.

This present application is a division of an application filed by me July 12, 1909, Serial Number 507,180.

In the drawings, 1 indicates a compression member, and 2 is the tension member, both of said members being flanged and preferably of different sizes, so that the ends may be nested as shown. While I have shown these members as having their flanges presented downwardly, it is obvious that they could be inverted, and also, instead of using a single channel-shaped tension member, two angles could be employed. Shapes other than a channel could also be employed for the compression member.

The web of the compression member is formed with one or more shoulders produced by a jog or bend 3, which preferably extends transversely. The end of the tension member is formed with corresponding jogs or bends 4, which coöperate and interlock with the jogs or bends 3 so as to firmly secure these ends together. Rivets 5 may be employed, and, if desired, a filler-block 6 may also be used, through which said rivets pass.

Where this structure is used as a truck bolster, the flanges of the nested ends may be cut away, as shown in Fig. 2, and the filler-block extended through these cutaway portions to form column guides 7. The flanges preferably extend slightly below the filler-block, so as to prevent displacement of the bolster supporting-frame or follower-plate, if a removable follower-plate is used. The structure is, of course, provided with a strut, which, in the instance of a brake beam, would be in the form of a lever post.

I am aware that minor changes may be made in the construction and arrangement of parts and substituted for those herein shown and described without departing from the nature and principle of my invention.

What I claim is:

1. In a trussed structure, nested flanged compression and tension members whose webs are interlocked, and a filler block interlocking with the flanges thereof.

2. In a trussed structure, nested flanged compression and tension members, whose webs are formed with interlocking indentations and whose flanges are provided with recesses, and a filler block extending into said recesses.

3. In a trussed structure, nested flanged compression and tension members, and a filler-block below which said flanges extend.

4. In a trussed structure, nested flanged compression and tension members, whose webs are formed with interlocking indentations, and a filler-block extending beyond said flanges.

In testimony whereof I hereunto affix my signature in the presence of two witnesses, this 22 day of April, 1910.

PHILIP B. HARRISON.

Witnesses:
E. T. WALKER,
M. F. HUNTOON.